(12) United States Patent
Lambright et al.

(10) Patent No.: US 7,196,622 B2
(45) Date of Patent: Mar. 27, 2007

(54) STATE MONITORING OF A CONTAINER

(75) Inventors: Stephen J. Lambright, San Francisco, CA (US); Blair B. LaCorte, Belvedere, CA (US); David L. Shannon, State College, PA (US); Ravindra U. Rajapakse, San Francisco, CA (US); Steven J. Farrell, Sunnyvale, CA (US)

(73) Assignee: Savi Technology, Inc., Sunnyvale, CA (US)

( * ) Notice: Subject to any disclaimer, the term of this patent is extended or adjusted under 35 U.S.C. 154(b) by 202 days.

(21) Appl. No.: 10/841,407

(22) Filed: May 6, 2004

(65) Prior Publication Data

US 2004/0246130 A1    Dec. 9, 2004

Related U.S. Application Data

(63) Continuation-in-part of application No. 10/821,296, filed on Apr. 8, 2004.

(60) Provisional application No. 60/468,930, filed on May 7, 2003, provisional application No. 60/468,929, filed on May 7, 2003, provisional application No. 60/528,334, filed on Dec. 9, 2003, provisional application No. 60/461,946, filed on Apr. 9, 2003, provisional application No. 60/470,294, filed on May 13, 2003, provisional application No. 60/514,968, filed on Oct. 27, 2003.

(51) Int. Cl.
*G08B 1/08* (2006.01)

(52) U.S. Cl. .............. 340/539.26; 340/522; 340/572.1; 235/384

(58) Field of Classification Search ........... 340/539.26, 340/10.1, 505, 429, 522, 572.1, 825.49, 521; 235/385, 384
See application file for complete search history.

(56) References Cited

U.S. PATENT DOCUMENTS 4,688,244 A    8/1987    Hannon et al.
(Continued)

OTHER PUBLICATIONS

Notification Of The International Search Report Or The Declaration and Written Opinion Of The International Searching Authority, PCT/US04/14206, Apr. 28, 2005, 9 pages.
(Continued)

*Primary Examiner*—Anh V. La
(74) *Attorney, Agent, or Firm*—Fenwick & West

(57) ABSTRACT

A container for locally determining a container state using a state device. The state device detects unexpected events by comparing expected event information with actual event information related to a container condition. The container condition includes, for example, environmental conditions, logistical or location conditions, and physical or security conditions. Thus, the container is able to intelligently monitor its state and raise an alert without intervention from a central system. The container can also be programmed and reprogrammed with updated logic, states, and/or expected event information. A sensor in the state device gathers input information for comparison to expected event information. A communication port in the state device receives event information. For example, a GPS (Global Positioning System) receiver can determine a current location for comparison to an expected location at the current time. In another example, an RFID (Radio Frequency Identification) receiver and transmitter automatically uploads state information to a central system.

36 Claims, 7 Drawing Sheets

U.S. PATENT DOCUMENTS

| | | | |
|---|---|---|---|
| 5,565,858 A | 10/1996 | Guthrie | |
| 5,835,012 A * | 11/1998 | Wilk | 340/539.26 |
| 5,892,441 A * | 4/1999 | Woolley et al. | 340/539.26 |
| 5,959,568 A | 9/1999 | Woolley | |
| 6,148,291 A | 11/2000 | Radican | |
| 6,714,121 B1 | 3/2004 | Moore | |
| 6,820,805 B2 | 11/2004 | Stevens | |
| 6,927,687 B2 * | 8/2005 | Carrender | 340/539.26 |
| 2001/0018672 A1 | 8/2001 | Petters et al. | |
| 2003/0125980 A1 | 7/2003 | Ribeiro | |
| 2003/0227382 A1 | 12/2003 | Breed | |
| 2004/0100379 A1 | 5/2004 | Boman et al. | |

OTHER PUBLICATIONS

Notification of Transmittal of the international Search Report and the Written Opinion of the International Searching Authority, or the Declaration, PCT Application No. PCT/US04/15168, Sep. 6, 2005, 6 pages.

International Search Report and the Written Opinion, PCT/US04/41501, Nov. 3, 2005, 11 pages.

Notification of Transmittal of the International Search Report and the Written Opinion, PCT/US04/14192, Jan. 18, 2006, 8 pages.

* cited by examiner

STATE MONITORING OF A CONTAINER

CROSS-REFERENCE TO RELATED APPLICATIONS

This application: claims priority under 35 U.S.C. § 119(e) to U.S. Patent Application No. 60/468,930, filed on May 7, 2003, entitled "Concepts for Smart Container," by Stephen Lambright et al.; claims priority under 35 U.S.C. § 119(e) to U.S. Patent Application No. 60/468,929 filed on May 7, 2003, entitled "Concepts for Nested Visibility of Logistics Units," by Stephen Lambright et al.; claims priority under 35 U.S.C. § 119(e) to U.S. Patent Application No. 60/528,334, filed on Dec. 9, 2003, entitled "Concepts for Nested Visibility of Logistics Units," by Stephen Lambright et al.; claims priority under 35 U.S.C. § 120 as a continuation-in-part to U.S. patent application Ser. No. 10/821,296, filed on Apr. 8, 2004, entitled "Continuous Security State Tracking for Intermodal Containers Through a Global Supply Chain," by David Shannon et al., which claims priority under 35 U.S.C. § 119(e) to U.S. Provisional Patent Application No. 60/461,946, filed on Apr. 9, 2003, entitled "Method and Apparatus for Managing, Securing, and Tracking Intermodal Containers Through the Global Supply Chain," by David Shannon, U.S. Provisional Patent Application No. 60/470,294, filed on May 13, 2003, entitled "Global Supply Chain Federation," by David Shannon, and U.S. Provisional Patent Application No. 60/514,968, filed on Oct. 27, 2003, entitled "Mechanisms for Secure RF Tags on Containers," by Ravi Rajapakse et al.; and is related to U.S. patent application Ser. No. 10/841,368, filed May 6, 2004, entitled "Nested Visibility for a Container Hierarchy," by Stephen Lambright et al., the entire contents of each being herein incorporated by reference.

BACKGROUND OF THE INVENTION

1. Field of the Invention

This invention relates generally to tracking a container and its contents and, more specifically, to locally monitoring a state of the container and its contents within a supply chain.

2. Description of Related Art

Ever-increasing global trade underscores a modem global economy which depends on goods transported in a global supply chain. Generally, a global supply chain is a network of international suppliers, manufacturers, distributors, and other entities that handle goods from their component parts to consumer consumption. For example, semiconductor testing equipment is exported from the United States to Taiwan, where semiconductors are processed and then sent to Malaysia for assembly into computers. Subsequently, the computers are shipped to warehouses in the United States, and ultimately, to consumer outlets for consumption.

However, a central system has limited visibility of containers in the global supply chain. Typically, operators at a checkpoint often manually upload reference numbers associated with containers to the central system. This high-level information may include verification that the container arrived or departed the checkpoint, and an evaluation of the container based on an external inspection, but fails to provide an evaluation of its contents. Furthermore, this information fails to account for events occurring between checkpoints that are not detectable at the checkpoint such as extreme humidity or temperatures.

Another drawback of the central system is the delay in alerts concerning the container. For example, after the operator scans and loads the container, the information must be uploaded and passed through several systems to a central database for processing. At that time the central system may realize that an alert should be raised, but there is additional delay in brining this to the attention of the operator. If the scan occurred while loading the container to a ship, the delayed alert may be too late.

Additionally, typical central systems have difficulty in collecting reliable information across heterogeneous systems. Because the information about what is happening on the container is not first-hand, and is not customized according to characteristics of the container, the central system must make inferences without an ability to verify or reevaluate information. With increasing traffic in global supply chains, and additional demands of monitoring containers, as well as contents, for economic, security, and logistic purposes, conventional central systems failed to meet these needs.

Therefore, what is needed is a decentralized state system comprising containers to automatically provide continuous and uniform monitoring of a container state. A container should be robustly configured with localized logic capable of determining a state in response to real-time events experienced by the container relative to dynamic and static event information concerning expected events.

SUMMARY OF THE INVENTION

The present invention meets these needs with systems and methods to monitor a state of a container. Because the state is determined locally, the container is able to intelligently respond to events occurring in blind spots of a central system. Furthermore, the state need not be based on inferences about conditions better observed by the container itself. Moreover, the container can be programmed to make state decisions specific to each trip through the global supply chain and report preprocessed information and/or information processed on-the-fly under its own initiative or responsive to an external request. A container-based state policy also provides uniformity of standards through heterogeneous checkpoints of the global supply chain.

In some embodiments, the container comprises a container and a state device. The state device locally determines a state using state logic. The state logic detects unexpected events by comparing expected event information with container actual event information in the form of conditions received from physical sensors. In one embodiment, event information comprises specific information about travel of the container through the global supply chain such as an expected route and an estimated time of arrival. Event information also comprises general state information related to authorized openings, identification information, and the like. Thus, the container is able to monitor its state and raise an alert without intervention from the central system. The container can be reprogrammed to include updated logic, updated states, and/or updated expected event information. In one embodiment, the container is retrofitted with the state device. In another embodiment, the state device is integrated into the container.

In some embodiments, the state device comprises one or more sensors to gather input information for a rule-based comparison to expected event information. A sensor can gather input information related to environmental conditions, logistics or location, physical conditions or security, and the like. As an example environmental condition sensor, a thermometer or other device gathers metrics about temperature, humidity, light, and other physical conditions. As an example location or logistics sensor, a location sensor indicates a current port location. As examples of physical or security sensors, a movement sensor can detect movement in bars that lock doors of the container shut and a hazardous substance sensor detects the presence of a chemical, biological, or nuclear substances.

In some embodiments, the state device further comprises a communication port to receive event information and send state information. For example, a GPS (Global Positioning System) receiver can receive information from a satellite used to determine a current location for comparison to an expected location at the current time. In another example, an RFID (Radio Frequency Identification) transceiver obtains current information from port systems and the like. In another example, a satellite transmitter or RFID transmitter can automatically send state information to the central system without intervention from a human operator, thereby supply information is available in a faster and more reliable way.

The features and advantages described in this summary and the following detailed description are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTIONS OF THE PREFERRED EMBODIMENTS

A system and method for monitoring a state of a container is disclosed. The system according to some embodiments of the present invention is set forth in FIGS. 1–5, and a method operating therein, according to some embodiments of the present invention, is set forth in FIGS. 6–7.

The accompanying description is for the purpose of providing a thorough explanation with numerous specific details. Of course, the field of container and cargo tracking and monitoring is such that many different variations of the illustrated and described features of the invention are possible. Those skilled in the art will thus undoubtedly appreciate that the invention can be practiced without some specific details described below, and indeed will see that many other variations and embodiments of the invention can be practiced while still satisfying its teachings and spirit. Accordingly, the present invention should not be understood as being limited to the specific implementations described below, but only by the claims that follow.

The processes, features, or functions of the present invention can be implemented by program instructions that execute in an appropriate computing device. Example computing devices include electronic tags, enterprise servers, application servers, workstations, personal computers, network computers, network appliances, personal digital assistants, game consoles, televisions, set-top boxes, premises automation equipment, point-of-sale terminals, automobiles, and personal communications devices. The program instructions can be distributed on a computer readable medium, storage volume, or the Internet. Program instructions can be in any appropriate form, such as source code, object code, or scripting code.

Figure 1:
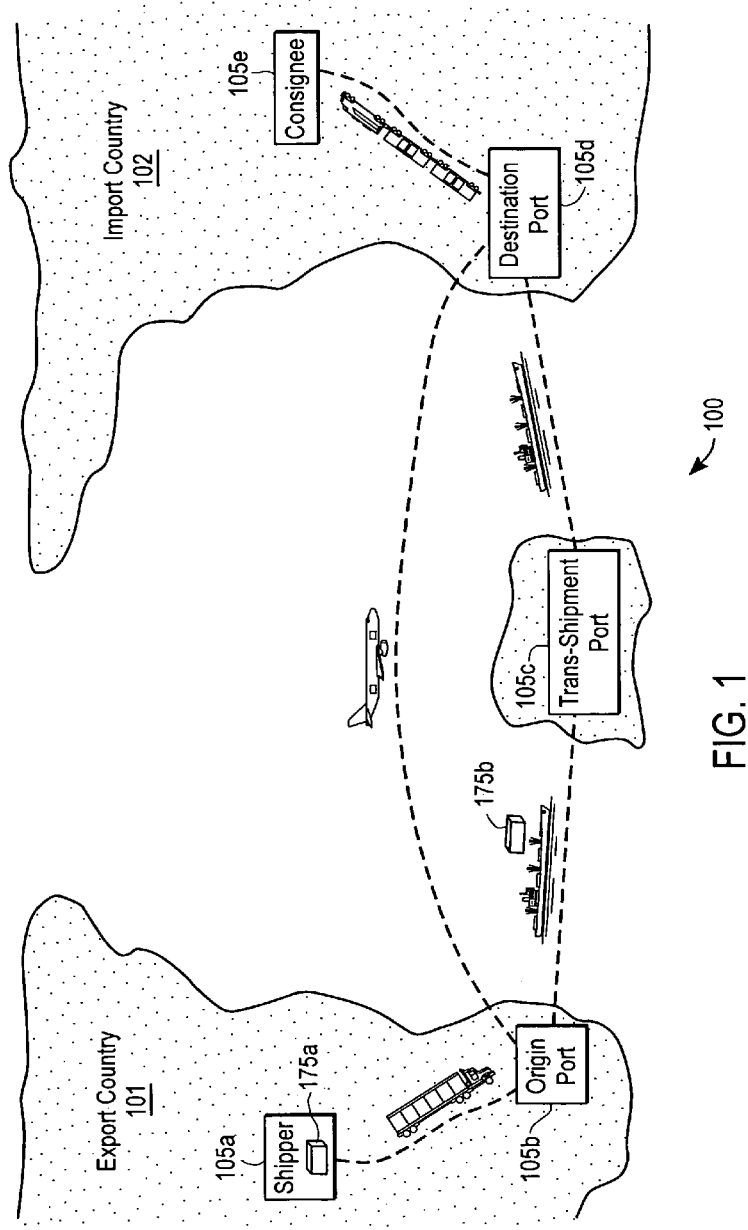
FIG. 1 is a schematic diagram illustrating an exemplary global supply chain according to one embodiment of the present invention.

FIG. 1 is a schematic diagram illustrating an exemplary global supply chain 100 including containers 175 according to one embodiment of the present invention. Note that FIG. 1 is merely an example global supply chain 100 that can have various geographical configurations, modes of transport, etc. within the scope and spirit of the present invention. The global supply chain 100 comprises a shipper 105a, an origin port 105b, a transshipment port 105c, a destination port 105d, and a consignee 105e.

The global supply chain 100 is used by a network of international suppliers, manufacturers, distributors, and other entities that handle goods from their component parts to consumer consumption. Accordingly, containers 175 and other cargo pass through the network points, checkpoints, ports, etc. The shipper 105a and the consignee 105e can be direct or indirect partner entities or units within a single entity exchanging a container 175 though a trade route. For example, a manufacturer sends computer components to an assembly plant by truck freight, which in turn ships assembled computers to a warehouse. The origin and destination ports 105b,d can be a shipping dock, an airport, a customs agency, an NVOCC (Non-Vessel Operating Common Carrier) or any other entity that sends and/or receives goods over a trade route. An internal supply chain is a similar network operated by a single entity or closely-associated entities At a high-level, the shipper 105a can transport a container 175 to the consignee 105e via one of many trade routes. As a first mode of transportation, a truck transports the container 175 from the shipper 105a to the origin port 105b. As a second and a third mode of transportation, a first vessel and a second vessel transport the container 175 from the origin port 105b to the destination port 105d with a transfer at a transshipment port 105c. As a fourth mode of transportation, a freight train transports the container to the consignee 105e. As a fifth mode of transportation, an airplane can transport the container 175 from the origin port 105b to the destination port 105d. In the case of international transportation, governmental agencies of the corresponding countries 101, 102, such as a Customs and National Security Agencies, exercise oversight over components of the primary network while private parties exercise oversight over components of the extended network. Note that, however, in one embodiment, the transportation occurs within the borders of a single country. As such, exporting and importing is between intranational geographical locations (e.g., between two states, cities, provinces, etc.) overseen by, for example, a security agency or an intranational governmental agency. Problematically, the container experiences nonuniform environmental, logistical and security standards through the disparate collection of transport modes, making the container 175 susceptible to the weakest link. Furthermore, blind spots limit the visibility of centralized systems.

The container 175 addresses this monitoring problem. The container 175 can initiate monitoring at the shipper 105a or elsewhere. The operator seals the container and downloads reference information such as a required body of information or other information that sets expectations for trip-specific events to occur in the global supply chain 100 (e.g., the destination, the time frame). The container 175 can also initiate the state monitoring with pre-loaded event information that is not trip-specific (e.g., standard protocols). At any point, the container 175 is capable of locally determining a state using, for example, logic implemented by a state machine.

The container state such as the security state is affected by physical conditions of the container 175 including, not only from direct security breaches such as opening the container 175, but from suspected security breaches raised by unexpected events. Examples of indirect security breaches include an unexpected location, unauthorized interaction, tampering, and detection of light. In repose to one of the listed or other events that strays outside acceptable parameters, the container 175 can change the security state and/or raise an alert. The alert can be output during subsequent reads at a checkpoint on the global supply chain 100, passed to an associated container 175, and the like. For example, the container 175 can raise an alert after recognizing that it has traveled an unexpected route. If the required bill of information sets Hawaii as a transshipment port 105c, but instead, the container 175 detects that it has landed in Singapore, the security state changes. In another example, the container 175 can land at the correct location in Hawaii, but several days later than expected. In still another example, the container 175 is opened by an unauthorized agent. Further embodiments of the container 175 and methods operating therein are discussed below.

Figure 2:
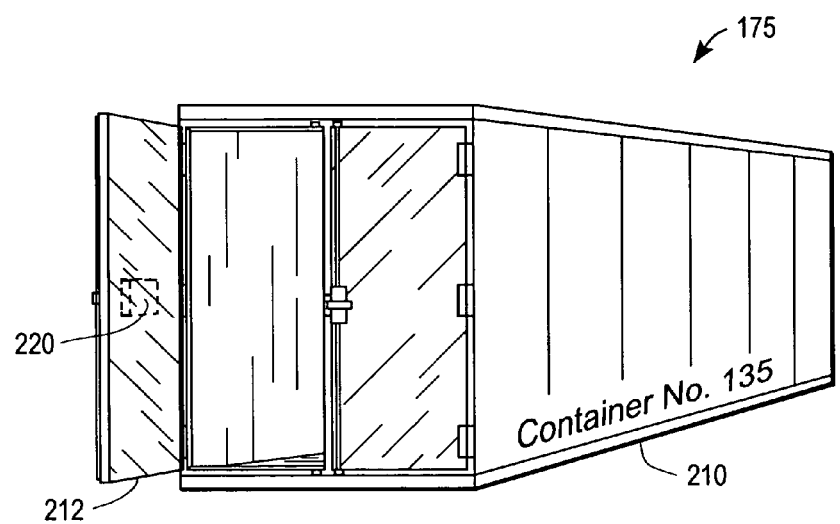
FIG. 2 is a schematic diagram illustrating an example container according to one embodiment of the present invention.

FIG. 2 is a schematic diagram illustrating the container 175 according to one embodiment of the present invention. The container 175 comprises an example container 210 with a state device 220. Containers 210 can comprise common enclosures referred to as, for example, goods, items, packages, cargo, intermodal containers, freight, boxes, and the like. Containers 210 can also comprise ISO (International Organization for Standardization) standardized enclosures referred to as, for example, IMCs (InterModal Container), IBCs (Intermediate Bulk Container), RTCs (Reusable Transport Container), ULDs (Unit Load Devices), and the like. Note that the container 210 is merely an example as it can vary in size, shape, and configuration (e.g., more than two doors). The container 210 can store several smaller containers in a nesting configuration.

The illustrated container 175 is implemented by retrofitting a container 210 with the state device 220 within a shell of the door 212. The state device 220 can be coupled, attached, mounted, or otherwise associated with the container 210 such that it can receive necessary input information. In one embodiment, the container 175 or door 220 is manufactured to include an integrated state device 220. Note that the security device 220 can be located elsewhere, such as in a floor or roof of the container 210.

The state device 220 determines a state based on event information and sensor information inputs. For example, a seal bolt senses whether the door 212 has been opened and outputs a signal. The state device 220 is able to apply rules in determining whether the opening is authorized. If the state device 220 concurrently receives an authorization code from a trusted agent, the state device 220 can determine that the open door 212 does not affect the container state. If, instead, the open door 212 is unauthorized, the state device 220 can active a visual alert and/or send an alert upstream in a security system. Additionally, the state device 220 can record the open door 212 regardless of its affect on the state. In another example, a shock sensor outputs metrics to the state device 220 which can log either each measurement or when the measurements exceed a predefined range. The state device 220 can add further log entries that help identify the responsible party. If product breakage is discovered during unpacking, a subsequent insurance claim investigation can collect evidence about who was responsible during unacceptable shock conditions. Further embodiments of the state device 220 are described further below with respect to FIGS. 3 and 4.

Figure 3:
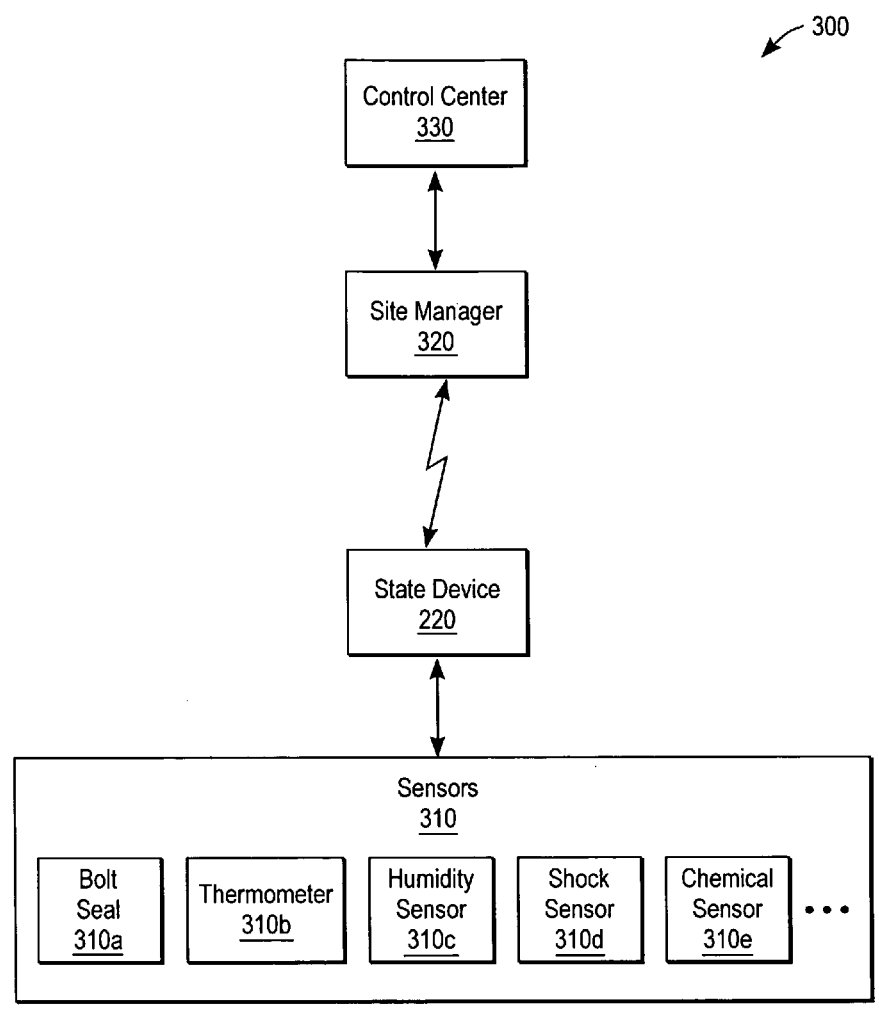
FIG. 3 is a block diagram illustrating a state system according to one embodiment of the present invention.

FIG. 3 is a block diagram illustrating a state system 300 according to one embodiment of the present invention. The state system 300 comprises the state device 220 in communication with sensors 310 and a site manager 320. The site manager 320, in turn, communicates with a control center 330. The state device 220 receives event information from the site manager 320 or other agent and sensor information from the sensors 310. In one embodiment, the state device 220 is programmable, thereby allowing reconfigurable logic by, for example, downloading an agent. Additionally, the state device 220 is capable of processing information from a variety of sensor types, and thus, it can translate various information types to a common format. The state device 220 can automatically send information upstream in the state system 300 without human operator intervention. In one embodiment, the state device 220 processes information and immediately or periodically outputs information to the site manager 320. In another embodiment, the state device 220 preprocesses information to output in response to a request from the state system 300. In still another embodiment, a downloaded agent can perform processing on the state device 220. Thus, the state device 220 enables an intelligent container that is self-aware of its state.

The sensors 310 further comprise a bolt seal 310a, a thermometer 310b, a humidity sensor 310c, a shock sensor 310d, a chemical sensor 310e and other sensors as appropriate to generate sensor input for the state device 220. For example, the thermometer 310b or other measurement device measures temperature, humidity, light, shock, and other surrounding conditions. In another example, the sensors 310 can comprise a chemical analysis component to detect hazardous chemicals or explosives, a biological component to detect biological weapons, or a nuclear component to detect special nuclear materials. In still another embodiment, the sensors 310 comprise rollers to track movement of slidable bars seals to detect open doors, and the like. However, the exact composition of the sensors can vary within the scope of the present invention. The sensors 310 can send information to the state device 220 through a sensor bus or individually. However, the sensors 310 are typically limited to observations of physical conditions. In one embodiment, the sensors 310 are separate devices from the state device 220 and can be supplied by a separate vendor. In another embodiment, the sensors 310 are integrated with the state device 220.

The site manager 320 can collect information from several state devices 220 at a location such as a checkpoint in the global supply chain 110. In turn, several site managers 320 can upload information to the control center 330. The control center 330 makes data centrally available.

Figure 4:
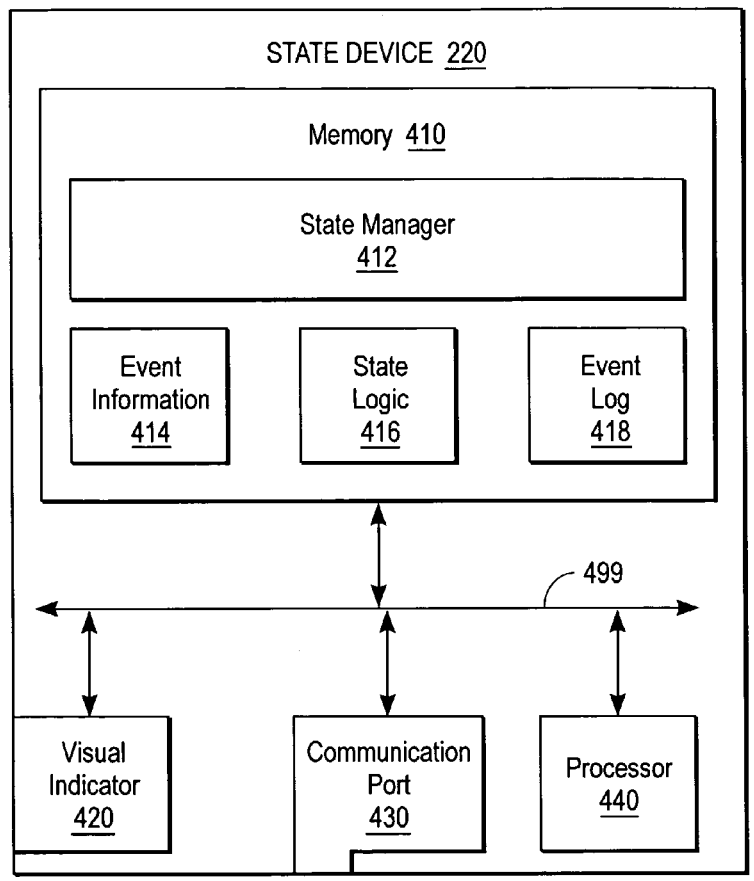
FIG. 4 is a block diagram illustrating a state device according to one embodiment of the present invention.

FIG. 4 is a block diagram illustrating a state device 220 according to one embodiment of the present invention. The state device 220 comprises a memory 410, a visual indicator 420, a communication port 430, and a processor 440, coupled in communication through a bus 499. The memory 410 can be any volatile or non-volatile device capable of storing program instructions and/or data.

The memory 410 further comprises a state manager 412, event information 414, state logic 416, and an event log 418. The state manger 412 controls operations within the state device 220 as well as interactions of external agents with the device. The state manager 412 controls interactions with the state device 220 either by initiating communication or responding to an external request, and also by authorizing requesters depending on a permission level. Moreover, the state manager 412 can be programmed or reprogrammed by an external request to monitor the container state specific to each trip through the global supply chain. In one embodiment, the state manager 412 receives updated logic to change the way that it detects unexpected events. In another embodiment, the state manager 412 receives updated state information for new or revised states. In still another embodiment, the state manager 412 receives updated expected event information such as updates in routing or authorized agents.

The state manager 412 can report preprocessed information and/or information processed on-the-fly under its own initiative. Reports can be initiated by the state manager 412 (e.g., as indicated by a state) or responsive to an external request. In one embodiment, the state manger 412 responds to a request by the state system 300 through the communication port 430 by applying state logic 412 to the event information 414 on-the-fly and encapsulating a response. In another embodiment, the state manger 412 searches the event log 418 for responsive information to, for example, a request for humidity levels. In yet another embodiment, the state manager 412 receives AMR (Automated Manifest Requirement) information from upstream in the state system 300 which it sends to the state logic 416 for comparison to inventory actually loaded into the container 175 as captured by a scanner sensor. In still another embodiment, the state manager 412 detects that communication with the state system 300 has been reestablished after a lapse and uploads state information.

The event information 414 comprises static and dynamic information related to expected conditions experienced by the container 175. The state logic 416 accesses expected event information for comparison to actual event information. The static information can include general expected events whereas the dynamic information can include trip-specific expected events for the container 175. In one embodiment, the event information 414 comprises a required body of information. The required body of information can be a data structure comprising, for example, manifest information, origin information, monitoring information, destination information, termination information, and the like. Note that event information can be updated by an authorized agent, such as when the estimated time of arrival or route information has been changed, to prevent false alerts The state logic 416 makes decisions regarding the current security state of the container 175 using, for example, event information 414. The state logic 416 is capable of implementing one or more state machines to maintain one or more states based on sensor information. A state can dictate actions for the state device 220 such as reporting the state or activating the visual indicator 420. Example state machines include an environmental conditions state machine, a location or logistics state machine, and a physical condition or security state machine, and the like. In one embodiment, the state logic 416 implements a security state machine as described below in FIG. 4.

The event log 418 stores events experiences by the container 175. The events can range, for example, from all information captured by sensors to just information affecting the container state. Also, the events can be organized in a data structure amenable to searches by the state manager 412.

The visual indicator 420 actives a physical indication of state or conditions. The visual indicator 420 can receive information or just an activate signal from the state manager 412. The physical indication comprises, for example, lights, an LED display, and the like. For example, a display can list states and/or sensor information.

The communication port 430 comprises physical, logical, analog and/or digital communication channels necessary to, for example, download the required body of information, output a security alert, and the like. For example, the communication port 430 comprises an RFID transceiver. In another example, the communication port 430 can comprise a GPS (Global Positioning System) receiver, enabling the state logic 416 to determine whether the container 175 is following an expected route. In yet another example, the communication port 430 comprises a satellite transponder to communicate with an Inmarsat satellite. As can be seen, the configuration described in FIG. 4 is only an example, and can modified according to desired capabilities of the state device 220.

The processor 440 comprises, for example, a CPU (Central Processing Unit), a mobile CPU, a controller, or other device to execute instructions and manipulate data related to the state logic 416 and other processes.

Figure 5:
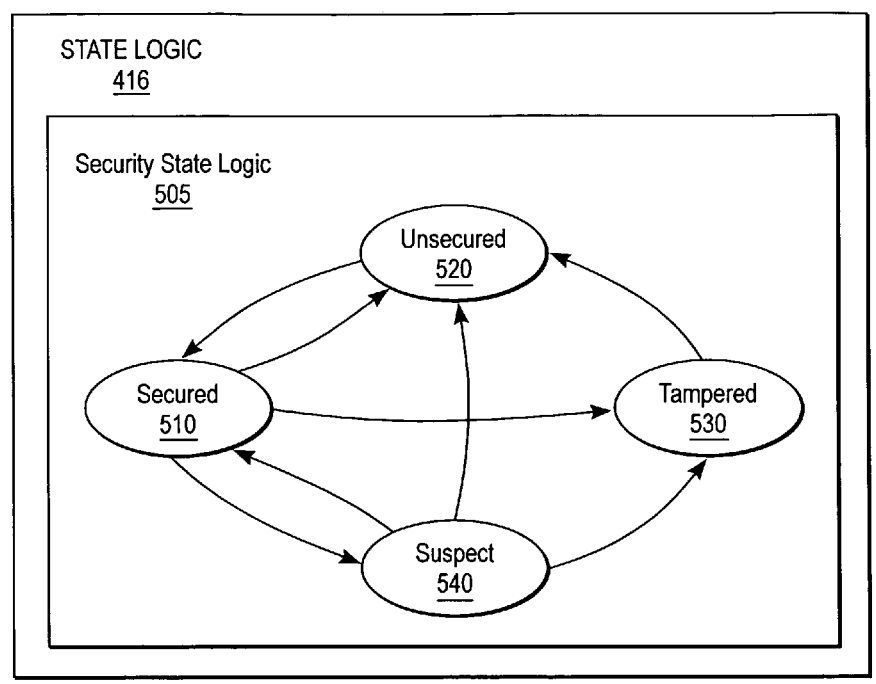
FIG. 5 is a schematic diagram illustrating a security state machine according to one embodiment of the present invention.

FIG. 5 is a schematic diagram illustrating a security state machine implemented by security state logic 505 within the state logic 416 according to one embodiment of the present invention. The nodes 510, 520, 530, 540 represent potential security states at different times of points during monitoring. The security state, as used herein, refers to an explicit or implied status or condition of the container subject to transport, or associated devices. Note that FIG. 5 is merely an example and various implementations include additional or fewer potential security states, and additional or fewer transitions between nodes responsive to business rules.

The security state logic 505 determines security states either directly from information collected by agents, or indirectly by first applying security business rules to the information. The secured node 510 refers to containers having assigned and locked seals while satisfying business rules. The unsecured node 520 refers to containers having at least one seal assigned and unlocked while satisfying business rules. The suspect node 540 refers to containers that fail at least one business rule without regard to whether a seal is assigned or unlocked. Also, the tampered node 530 refers to containers having at least one tampered with seal without regard to business rules.

Transitions occur when triggering changes in information are detected by the security state logic 505. In one example, the status is initiated at the secured node 510 responsive to an inspection, and/or sealing at the shipper 105a. In another example, the security state logic 505 transitions from the secured node 510 to the unsecured node 520 responsive to detecting an unlocked seal on the state device 220. In yet another example, the security state logic 505 transitions from the secured node 510 to the suspect node 540 responsive to failing business rule, such as when the container 175 detects that it is in an unexpected location. In still another example, the security state logic 505 transitions from the secured node 510 to the tampered node 530 responsive to detecting an opened seal on the state device 220. The tampered node 530 of a preferred embodiment, is physically cleared by removing and/or resetting the seal. The security state logic 505 transitions to a suspect, unsecured, or tampered node 540, 520, 530 when conditions become abnormal as determined by the state device 220.

Figure 6:
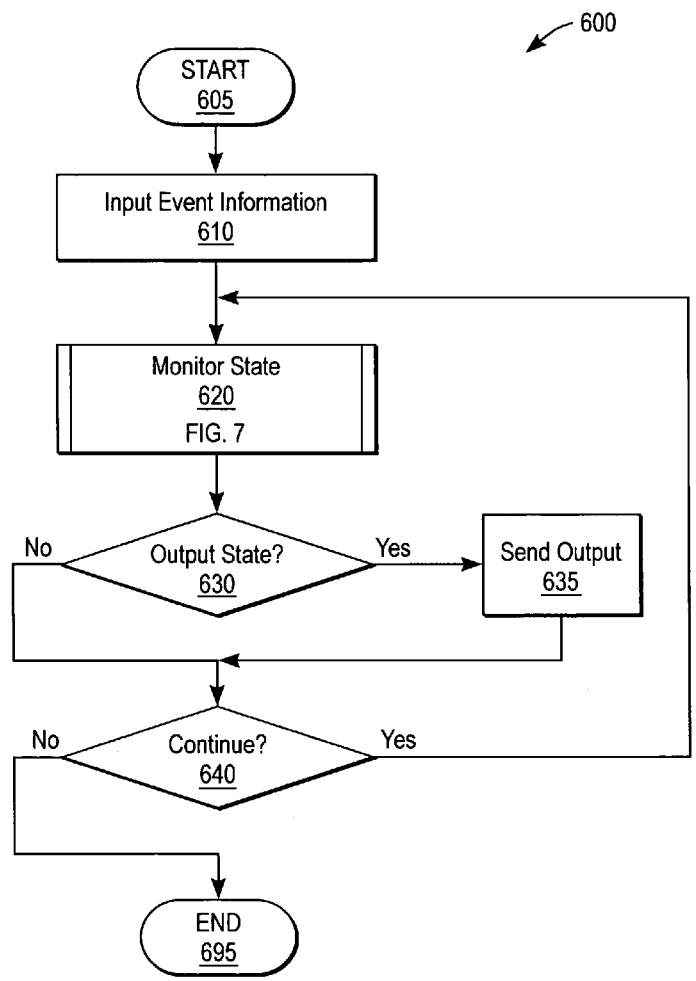
FIG. 6 is a high-level flow chart illustrating a method for monitoring a container state within a container according to one embodiment of the present invention.

FIG. 6 is a high-level flow chart illustrating a method 600 for monitoring a container state within the container 175 according to one embodiment of the present invention. The communication port 430 inputs 610 event information 414 to the memory 410, for example, by downloading from the site manager 320. In one embodiment, dynamic information that changes from trip to trip is downloaded, while static information can be pre-loaded. Advantageously, the event information enables the state device 220 to make local state determinations that are specific to the container 175.

The state logic 416 uses the event information 414 to locally monitor 620 the state. More specifically, by comparing event information 414 to physical conditions input by the sensors 310 or other information, the state logic 416 is able to detect unexpected events. State determinations made through local information are more reliable to typical prior art systems that use central systems to make inferences about the security state. Moreover, because there are many blind spots in the global supply chain 100 the prior art systems are unable to reliably gather information while a container travels through these blind spots.

The communication port 430 can output current states 630. For example, the output can be sent 635 directly to an agent at a checkpoint within the global supply chain 100, to the site manager 320 collecting data concerning containers 175, by activating a red light, and the like. Output can be initiated by the state device 220 or responsive to external requests. The process continues 640 until, for example, it is terminated by the consignee 105e.

Figure 7:
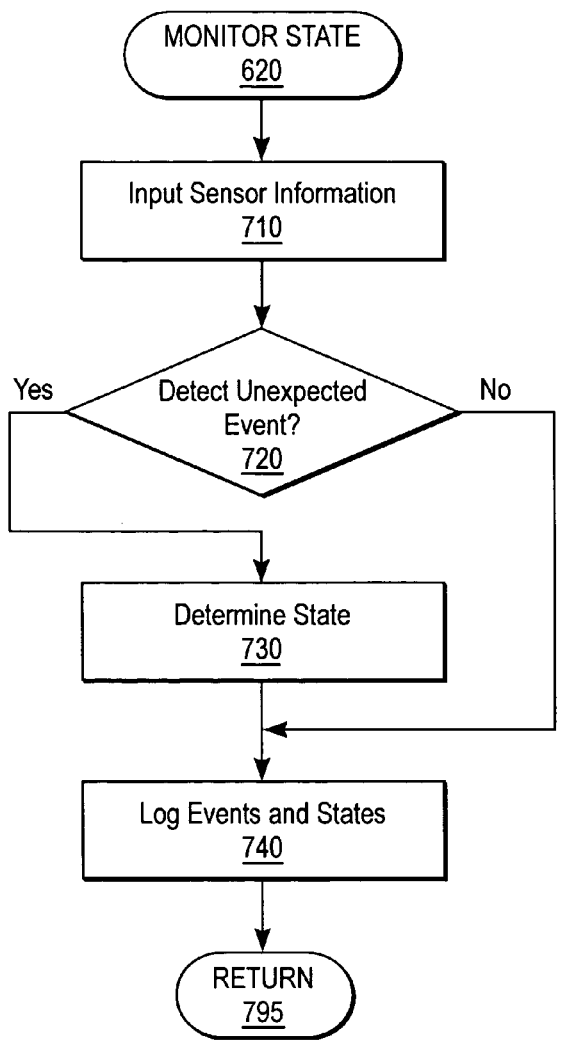
FIG. 7 is a flow chart illustrating a method for monitoring a container state according to one embodiment of the present invention.

FIG. 7 is a flow chart illustrating the method 630 for monitoring the container state according to one embodiment of the present invention. The state logic 416 initiates state monitoring, for example, when the container 175 is sealed at the shipper 105a. The sensors 310 input 610 sensor information through the communication port 430. If the state logic 416 detects 720 unexpected events relative to the event information 414, the state logic 416 determines 730 a state which may change or stay the same.

In the embodiment of FIG. 7, whether or not an unexpected event occurs, the state manager 412 logs 740 events and states in the event log 418. For example, the state manager 412 can record each temperature reading, or only temperature readings that result in a state change. The state manager 412 can log information in a data structure optimized to address requests from the state system 300.

We claim:

1. In a container having a state device with a plurality of types of sensor inputs, a method for local security state monitoring, comprising:
   receiving expected event information specific to the container;
   receiving actual event information, from a plurality of types of sensors, that is related to a condition of the container;
   detecting an unexpected event relative to the expected event information; and
   determining a security state for the container responsive to the unexpected event, including applying business rules that describe the security state based on the actual event information from the plurality of types of sensors.

2. The method of claim 1, further comprising:
   outputting the security state.

3. The method of claim 1, further comprising:
   outputting the security state with an RFID (Radio Frequency IDentification) device.

4. The method of claim 1, further comprising:
   outputting the state responsive to an external request.

5. The method of claim 1, further comprising:
   changing the security state responsive to the determination.

6. The method of claim 1, further comprising:
   updating the security state monitoring in the container.

7. The method of claim 6, wherein the updating the security state monitoring comprises:
   receiving updated logic for detecting the unexpected event.

8. The method of claim 6, wherein the updating the state monitoring comprises:
   receiving updated security state information.

9. The method of claim 6, wherein the updating the security state monitoring comprises:
   receiving updated specific expected event information.

10. The method of claim 1, further comprising:
    recording unexpected events and security states.

11. The method of claim 1, wherein specific event information comprises one from the group containing: route information, departure information, arrival information, authorized agent information, a required body of information, and contents.

12. The method of claim 1, wherein the step of receiving expected event information comprises:
    receiving expected physical condition information;
    wherein the step of receiving actual event information comprises receiving actual physical condition information.

13. The method of claim 1, wherein the step of receiving expected event information comprises:
    receiving expected interaction information;
    wherein the step of receiving actual event information comprises receiving actual interaction information.

14. The method of claim 1, further comprising:
    receiving general event information comprising one from the group containing: environmental conditions, logistical or location conditions, and physical or security conditions.

15. A container having a security device to locally monitor a security state of the container, comprising:
    a memory to store expected event information specific to travel of the container;

a plurality of types of inputs to receive actual event information related to a condition of the container from a plurality of types of sensors; and state logic, coupled in communication with the memory and the plurality of types of inputs, to detect an unexpected event relative to the expected event information, and determine the security state for the container responsive to the unexpected event, including applying business rules that describe security state based on the actual event information from the plurality of types of sensors.

16. The container of claim 15, further comprising a communication port to output the security state.

17. The container of claim 15, further comprising a communication port to output the security state with an RFID (Radio Frequency IDentification) device.

18. The container of claim 15, further comprising a communication port to output the security state responsive to an external request.

19. The container of claim 15, wherein the state logic changes the security state responsive to determining that the actual event information is an unexpected event.

20. The container of claim 15, wherein the security device updates the monitoring.

21. The container of claim 20, wherein the input receives updated logic for detecting the unexpected event.

22. The container of claim 20, wherein the input receives updated security state information.

23. The container of claim 20, wherein the input receives updated receives updated specific expected event information.

24. The container of claim 15, further comprising an event log to store unexpected events and security states.

25. The container of claim 15, wherein specific event information comprises one from the group containing: route information, departure information, arrival information, authorized agent information, a required body of information, and contents.

26. The container of claim 15, wherein the specific event information comprises an expected physical condition, and the input receives actual event information related to a physical condition of the container.

27. The container of claim 15, wherein the specific event information comprises an expected interaction condition, and the input receives actual event information related to an interaction with the container.

28. The container of claim 15, wherein the input receives general event information comprising one from the group containing: environmental conditions, logistical or location conditions, and physical or security conditions.

29. A computer product, comprising:

a computer-readable medium having computer readable medium instructions and data embodied thereon for a method of local security state monitoring in a container with a plurality of types of sensor inputs, the method comprising the steps of:

receiving expected event information specific to the container;

receiving actual event information from a plurality of types of sensors that is related to a condition of the container;

detecting an unexpected event relative to the expected event information; and determining a security state for the container responsive to the unexpected event, including applying business rules that describe the security state based on the actual event information from the plurality of types of sensors.

30. The computer product of claim 29, further comprising:

outputting the security state.

31. The computer product of claim 29, further comprising:

changing the security state responsive to the determination.

32. The computer product of claim 29, further comprising:

updating the security state monitoring in the container.

33. The computer product of claim 32, wherein the updating the security state monitoring comprises:

receiving updated logic for detecting the unexpected event.

34. The computer product of claim 32, wherein the updating the state monitoring comprises:

receiving updated security state information.

35. The computer product of claim 32, wherein the updating the security state monitoring comprises:

receiving updated specific expected event information.

36. The computer product of claim 29, further comprising:

recording unexpected events and security states.

* * * * *